US007826617B2

(12) United States Patent
Funnell et al.

(10) Patent No.: US 7,826,617 B2
(45) Date of Patent: Nov. 2, 2010

(54) APPARATUS AND METHOD FOR DETERMINING UPLINK CIPHERING ACTIVATION TIME IN UNIVERSAL MOBILE TELECOMMUNICATIONS SYSTEM USER EQUIPMENT

(75) Inventors: Nicola M. Funnell, Warwickshire (GB); Andrew Farnsworth, Worcestershire (GB); Robert J. Harrison, Birmingham (GB)

(73) Assignee: M-Stack Limited, Birmingham (GB)

( * ) Notice: Subject to any disclaimer, the term of this patent is extended or adjusted under 35 U.S.C. 154(b) by 1089 days.

(21) Appl. No.: 10/916,658

(22) Filed: Aug. 12, 2004

(65) Prior Publication Data

US 2005/0036619 A1    Feb. 17, 2005

Related U.S. Application Data

(60) Provisional application No. 60/495,559, filed on Aug. 15, 2003.

(30) Foreign Application Priority Data

Aug. 15, 2003    (CA) .................................... 2437631

(51) Int. Cl.
H04K 1/00    (2006.01)
(52) U.S. Cl. ...................................... 380/273; 380/247
(58) Field of Classification Search .................. None
See application file for complete search history.

(56) References Cited

U.S. PATENT DOCUMENTS

| 5,325,419 | A | * | 6/1994 | Connolly et al. | 455/435.1 |
| 5,546,464 | A | | 8/1996 | Raith et al. | |
| 5,574,785 | A | * | 11/1996 | Ueno et al. | 380/2 |
| 6,870,932 | B2 | * | 3/2005 | Jiang | 380/273 |
| 2003/0076859 | A1 | * | 4/2003 | Jiang | 370/509 |
| 2004/0004947 | A1 | * | 1/2004 | Herrmann et al. | 370/338 |

FOREIGN PATENT DOCUMENTS

| EP | 1 089 487 A2 | 4/2001 |
| EP | 1 248 487 A2 | 10/2002 |

OTHER PUBLICATIONS

XP-002307355, Jun. 2003, 3GPP TS 25.331.

* cited by examiner

Primary Examiner—Kambiz Zand
Assistant Examiner—Peter Poltorak

(57) ABSTRACT

The details of an apparatus and method for determining uplink ciphering activation time in universal mobile telecommunications system user equipment are disclosed herein. The ciphering activation time is determined for radio bearers other than RB2 by measuring the data rate on each target radio bearer during the time that it takes for a polling or RRC message sent from the user equipment UE to be acknowledged by the network UTRAN. For RB2, the uplink ciphering activation time is determined by taking into account the size of the RRC response message and the data already queued on RB2 for transmission.

8 Claims, 8 Drawing Sheets

APPARATUS AND METHOD FOR DETERMINING UPLINK CIPHERING ACTIVATION TIME IN UNIVERSAL MOBILE TELECOMMUNICATIONS SYSTEM USER EQUIPMENT

CROSS-REFERENCE TO RELATED APPLICATION

This application claims the priority of Canadian Patent Application No. 2437631 filed on Aug. 15, 2003 and U.S. Patent Application No. 60/495,559 filed on Aug. 15, 2003, the contents of which are incorporated by their entirety herein.

BACKGROUND

1. Technical Field

This application relates to UMTS (Universal Mobile Telecommunications System) in general, and to an apparatus and method for determining uplink ciphering activation time in universal mobile telecommunications system user equipment in particular.

2. Description of the Related Art

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS and the 3GPP2 (Third Generation Partnership Project 2) has been known to publish and set standards for CDMA (Code Division Multiple Access) based UMTS. Within the scope of a particular standardization body, specific partners publish and set standards in their respective areas.

In UMTS, the data flow on any connection, known as a radio bearer, between a user equipment (UE) and the UMTS Terrestrial Radio Access Network (UTRAN) can be ciphered i.e. encrypted at any point in time, under the control of commands from the UTRAN. The ciphering start or activation time is the logical sequence number at which the UE and UTRAN both change the ciphering configuration used on that radio bearer in a given direction, either uplink or downlink. This ensures synchronicity between the UE and UTRAN and facilitates a smooth ciphering changeover without undue delay. A separate time-independent logical sequence number is maintained for each radio bearer for each direction. It increments by one for every packet transferred between the UE and UTRAN.

In the 3GPP technical specification for the UE control process (3GPP TS 25.331 v3.13.0. RRC protocol specification), section 8.6.3.4 states that if a new ciphering configuration is to be applied and there is no pending ciphering activation time, from a previous ciphering change, then the UE is to choose an activation time for the new ciphering configuration to be applied. However, the specification does not give a method for choosing the activation time. The only guidance it gives is to "set a suitable value that would ensure a minimised delay in the change to the latest ciphering configuration". This guidance is open to substantial interpretation as to how a suitable value should be chosen.

The present invention aims to address the above problem.

SUMMARY

According to one aspect of the present application, there is provided a method of determining uplink ciphering activation time for a communications channel between a user equipment and a telecommunications network, the uplink ciphering activation time for determining the time at which a new ciphering configuration is to be implemented between the user equipment and the network, the method comprising the step of selecting an uplink activation time so as to minimise delay in the change to the new ciphering configuration.

It is an object of the present application to provide for determination of the uplink ciphering activation time to comply with the standards but in ways that are not mandated by the standards.

The method may include sending a message from the user equipment to the network on a signalling channel, determining a response time for said message, said response time being related to the time at which an acknowledgment of said message is received from the network at the user equipment and determining the uplink ciphering activation time for the communications channel in dependence on the response time. This may involve determining a data rate for the communications channel during a time interval represented by the response time and determining the uplink ciphering activation time based on said data rate or based on an estimated or historical data rate.

According to another aspect of the present application, there is also provided user equipment for determining uplink ciphering activation time for a communications channel between the user equipment and a telecommunications network, the uplink ciphering activation time for determining the time at which a new ciphering configuration is to be implemented between the user equipment and the network, the equipment including a processor for calculating an uplink activation time so as to minimise delay in the change to the new ciphering configuration.

Other aspects and features of the present application will become apparent to those ordinarily skilled in the art upon review of the following description of specific embodiments of an apparatus and method for determining uplink ciphering activation time in universal mobile telecommunications system user equipment in conjunction with the accompanying figures.

BRIEF DESCRIPTION OF THE DRAWINGS

Embodiments of the present application will now be described, by way of example only, with reference to the attached figures, wherein.

The same reference numerals are used in different figures to denote similar elements.

DETAILED DESCRIPTION OF THE DRAWINGS

Figure 1:
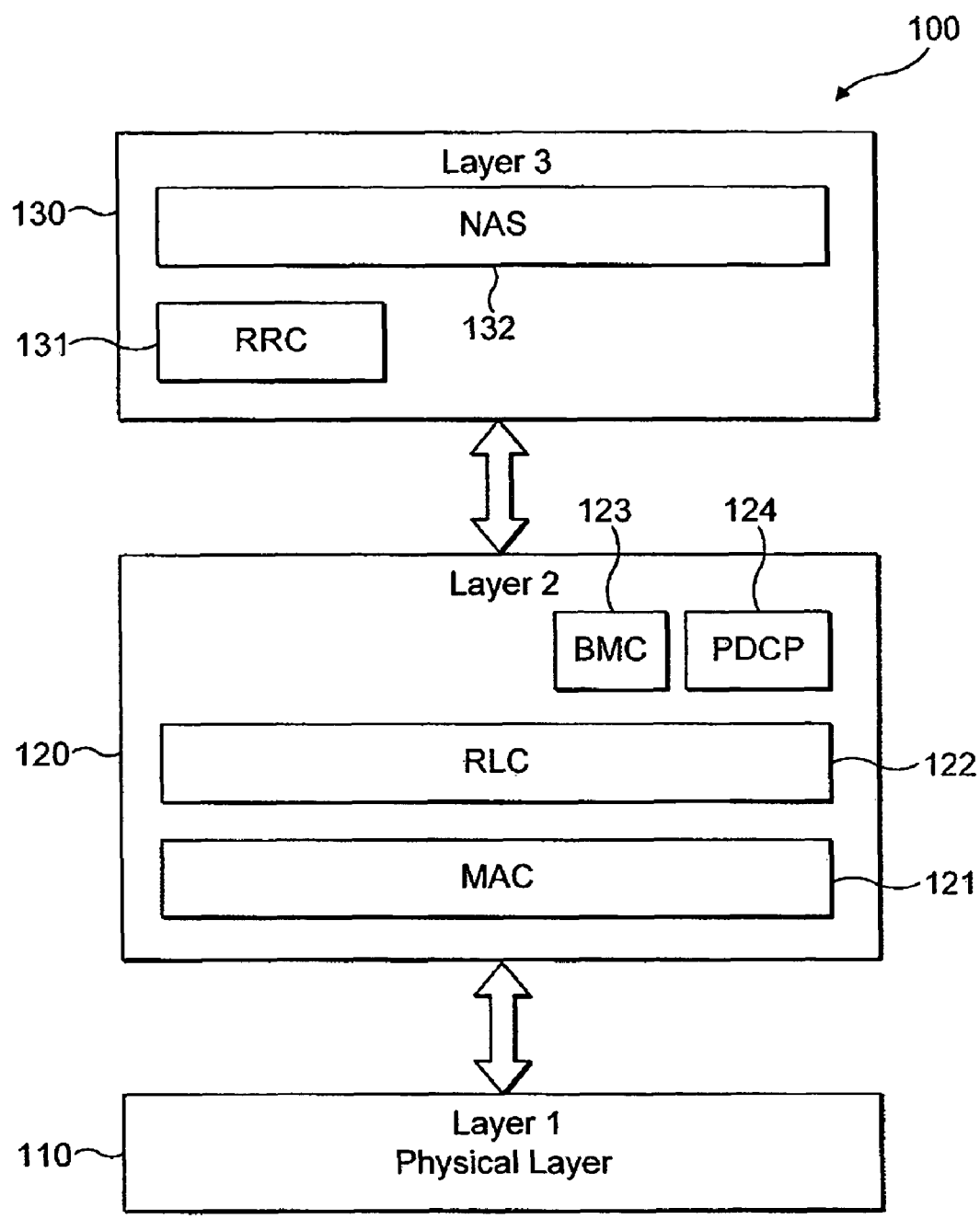
FIG. 1 is a block diagram illustrating an example of a protocol stack structure in accordance with the present invention.

Referring to the drawings, FIG. 1 is a block diagram illustrating an example of a protocol stack structure in accordance with the present invention.

The protocol stack 100 defines the radio interface protocols that establish, control and free radio bearer services in the platform. The protocol stack 100 shows the functional blocks in Layers 1 to 3, i.e. the Physical Layer (L1) 110, the Link Layer (L2) 120 and the Network Layer (L3) 130, using the standard Open Systems Interconnect (OSI) terminology.

Layer 2 120 includes a number of sub-layers, namely the Medium Access Control (MAC) sub-layer 121, the Radio Link Control (RLC) sub-layer 122 and Packet Data Convergence Protocol (PDCP) 123 and Broadcast/Multicast Control (BMC) 124 sub-layers. Layer 3 130 comprises a Radio Resource Control (RRC) sub-layer 131 and a Non-Access Stratum (NAS) sub-layer 132.

Layer 3 130 and the RLC sub-layer 122 consist of control and user planes. The PDCP and BMC sub-layers 123, 124 exist only in the user plane. The RRC sub-layer 131 exists in the control plane only and provides an information transfer service to the NAS sub-layer 132. The RRC sub-layer 131 is responsible for controlling the configuration of Layer 1 110 and Layer 2 120. When the UTRAN wishes to change the UE configuration it will issue a message to the UE containing a command to invoke a specific RRC procedure. The RRC 131 sub-layer of the UE decodes this message and initiates the appropriate RRC procedure. Generally when the procedure has been completed (either successfully or not) then the RRC 131 sends a response message to the UTRAN (via the lower layers) informing the UTRAN of the outcome. It should be noted that there are a few scenarios where the RRC 131 will not issue a response message to the UTRAN; in those cases the RRC 131 need not and does not reply.

One of the security features implemented by the protocol stack 100 is ciphering functionality. This allows for much improved protection of data and greater user identity confidentiality. It is a complex feature which affects most layers of the protocol stack 100, as will be explained in detail below.

The UTRAN may start or change the ciphering configuration by sending a ciphering mode information parameter (IE) in one of a number of RRC messages. These are the Radio-BearerSetup, RadioBearerReconfiguration, RadioBearerRelease, TransportChannelReconfiguration, PhysicalChannelReconfiguration, UTRAN Mobility Information, Cell Update Confirm and Security Mode Control messages. The ciphering configuration is applied to all radio bearers in the domain affected by the UTRAN message.

The RRC sub-layer 131 does not perform any of the ciphering, but is responsible for managing and configuring ciphering in the lower layers of the stack in accordance with instructions from the UTRAN RRC.

In general terms, for Acknowledged Mode (AM) or Unacknowledged Mode (UM) RLC mode radio bearers, when the UE RRC 131 receives the ciphering mode Information parameter (IE), after it has actioned all other parameters in the message, it will suspend and then reconfigure all RLC entities belonging to that domain, possibly including the signalling radio bearer entities, except for RB2, according to the new configuration. This is in accordance with section 8.6.3.4 of the 3GPP TS 25.331 v3.13.0. RRC protocol specification. The special case of RB2 will be discussed in detail below.

Figure 2:
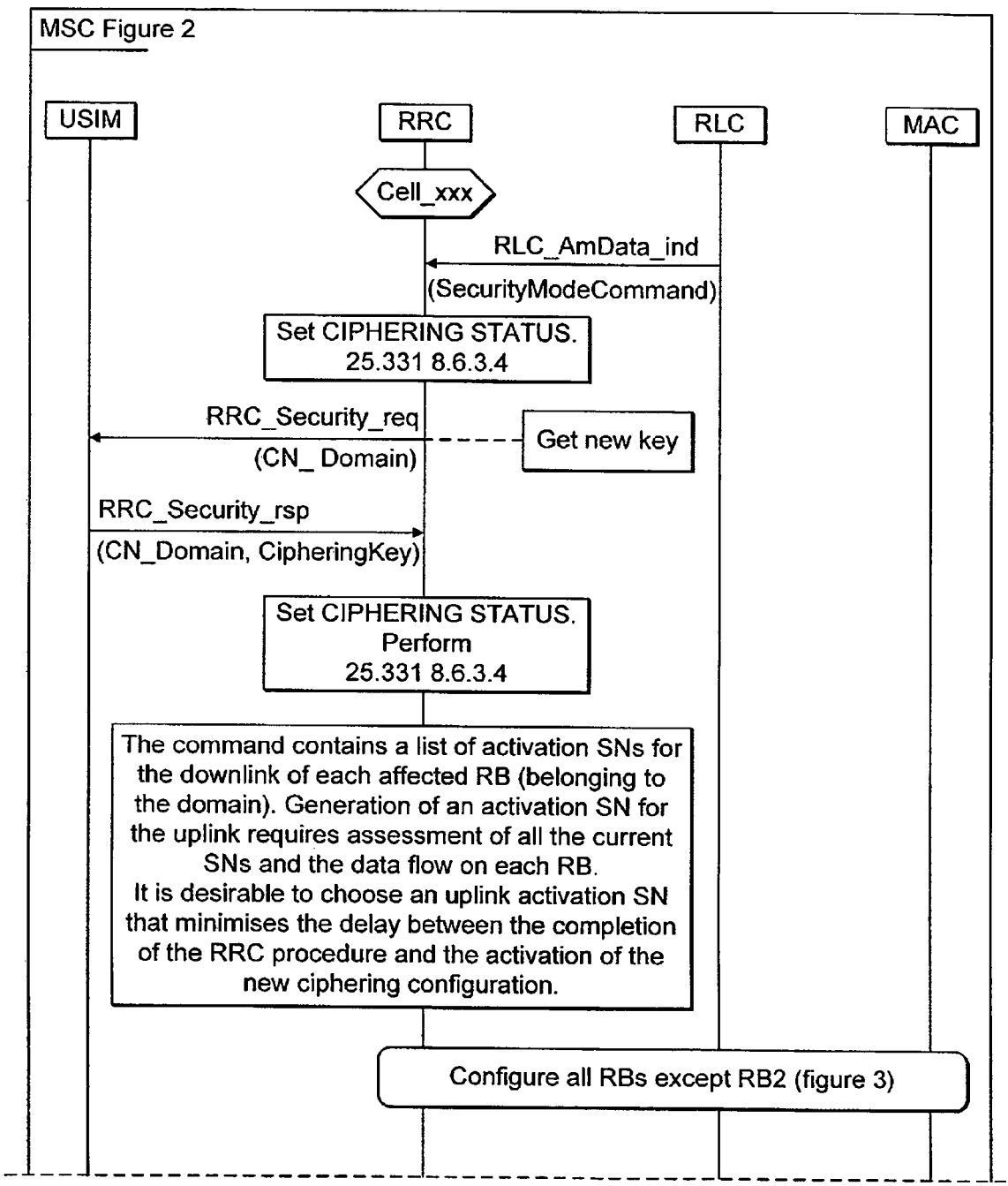
FIG. 2 is a message sequence chart illustrating the Security Mode Command procedure from a ciphering perspective.
Figure 2:
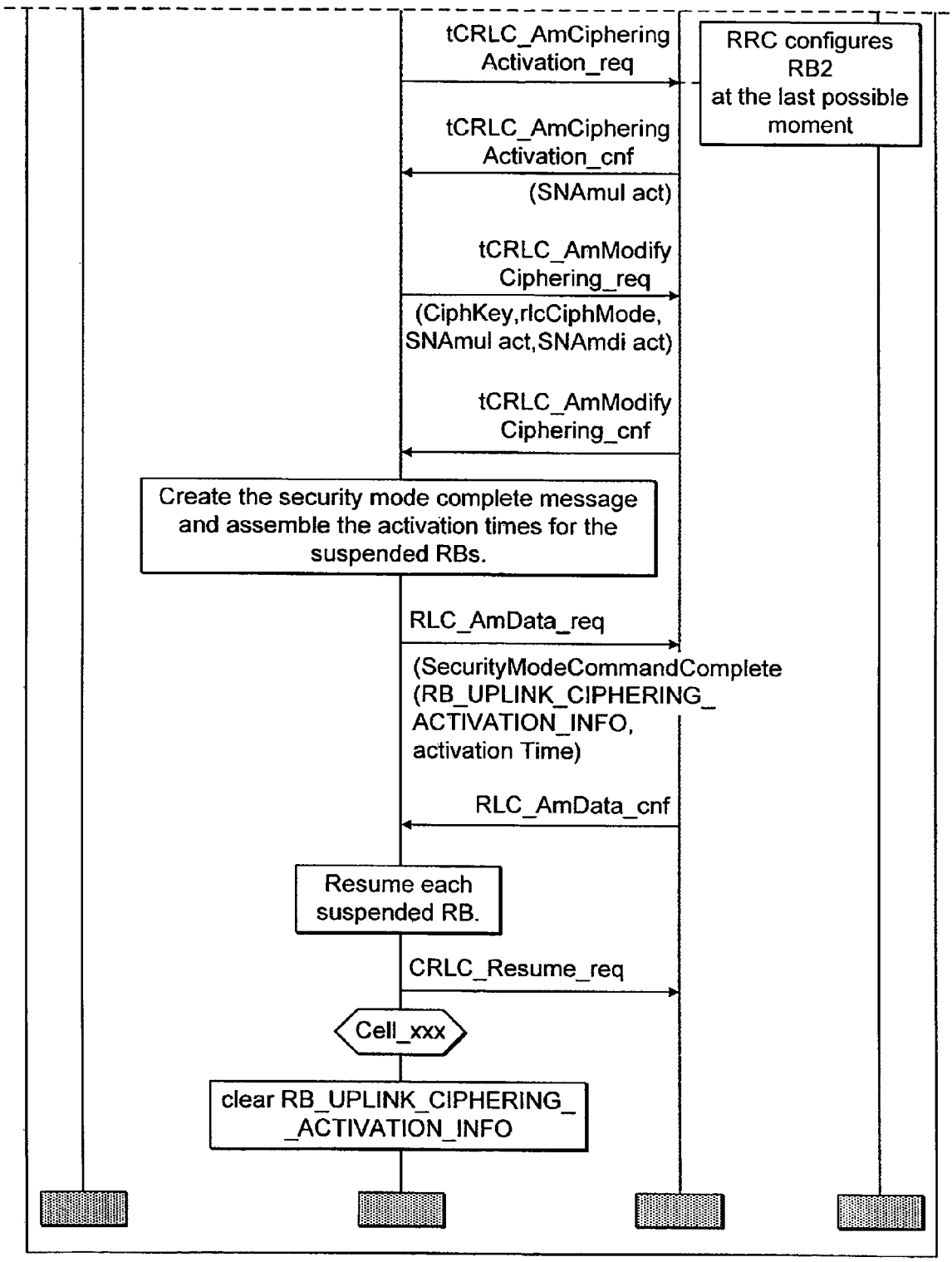
Figure 3:
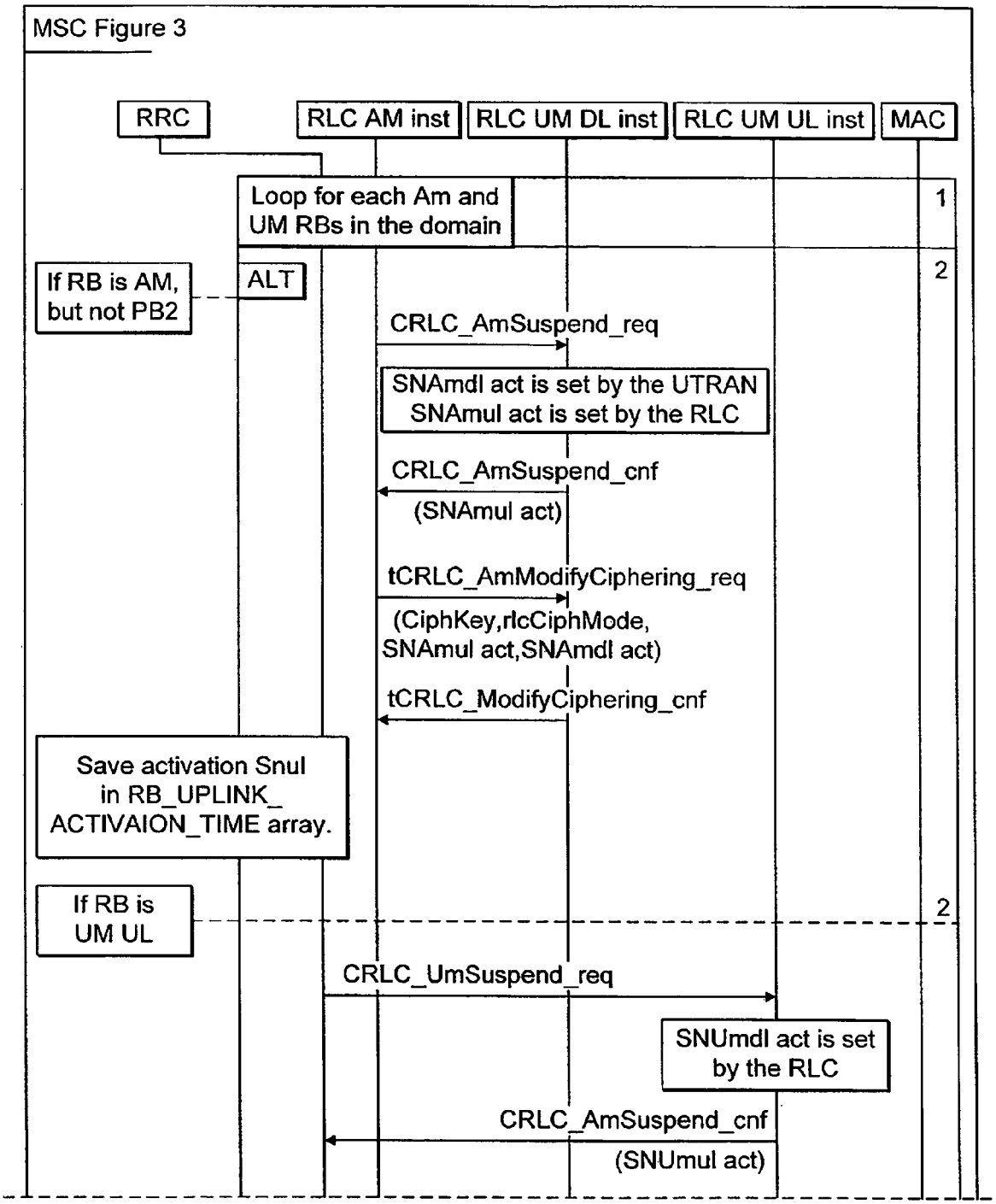
FIG. 3 is a message sequence chart illustrating in detail a part of the procedure shown in FIG. 2.
Figure 3:
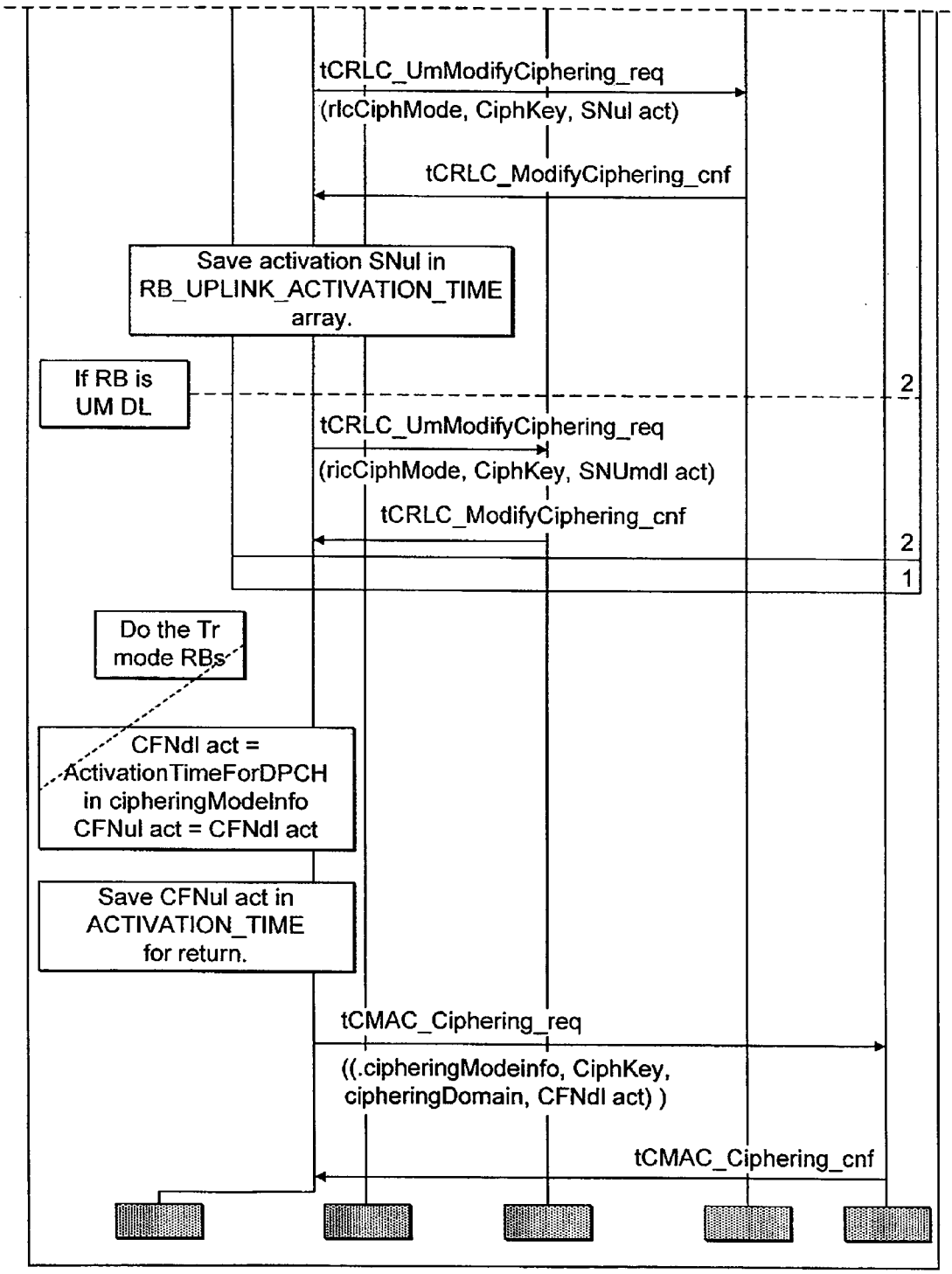

FIG. 2 shows a Message Sequence Chart (MSC) for the security mode command from a ciphering perspective. FIG. 3 shows a Message Sequence Chart (MSC) for the configuration of all Radio Bearers except RB2 from a ciphering perspective. To improve readability of the MSC, the signal parameters shown do not exactly match those used in the standard. However the signal names reflect those used in the standard.

The RLC entities 122 inform the RRC 131 of the activation time at which the uplink configuration is to take place. For the downlink side, the activation time is provided by the UTRAN as a sequence number, which is explained below. Calculation of the activation time for the uplink side will be described in detail below. The RRC 131 informs the UTRAN of the calculated activation time. When the UTRAN has acknowledged this information, the RRC 131 informs the RLC entities that they should resume operation. The detailed overall procedure is illustrated in the Message Sequence Charts of FIGS. 2 and 3.

A sequence number (SN) is used as part of a unique identifier for each radio frame using AM or UM RLC mode. It also provides a means of synchronisation between the UE and the UTRAN. That is, if a ciphering configuration is to be changed, the UTRAN will inform the UE of the new configuration and the SN of the frame on which the new configuration will be used. This is also called the ciphering activation time, which should not be confused with the "activation time" associated with a radio bearer RB reconfiguration, for which see sections 8.2.2, 8.6.3.1 and 8.6.4.12 of the 3GPP TS 25.331 v3.13.0. RRC protocol specification. There are two SNs for each UM or AM RLC mode radio bearer, one for uplink and one for downlink. The SNs are updated and maintained by the RLC sub-layer 122, but are also used by the RRC 131 when the ciphering configuration changes. Reference is further directed to sections 8.1.12.3 and 8.6.3.4 of the 3GPP TS 25.331 v3.13.0. RRC protocol specification and 6.6.4.1 of the 3GPP TS 33.102 v3.13.0. Security Architecture specification.

The uplink activation time could be determined in a number of ways. One way would be to use the current sequence number values, which would comply with the standard by implementing no delay at all. This solution would immediately suspend all traffic on the target radio bearers. For real-time services, the interruption introduced may reduce the quality of service to an unacceptable extent, since the data flows on the radio bearers will be stopped until the message exchange with the UTRAN has been completed and acknowledged.

An alternative solution is to use a large fixed increment for each radio bearer. The problem with this solution is that no account is taken of the responsiveness of the UTRAN nor of the current data rates on the target radio bearers, so this approach could cause long delays before the new ciphering configuration is used or may interrupt data flow if the delay is not long enough.

Figure 4:
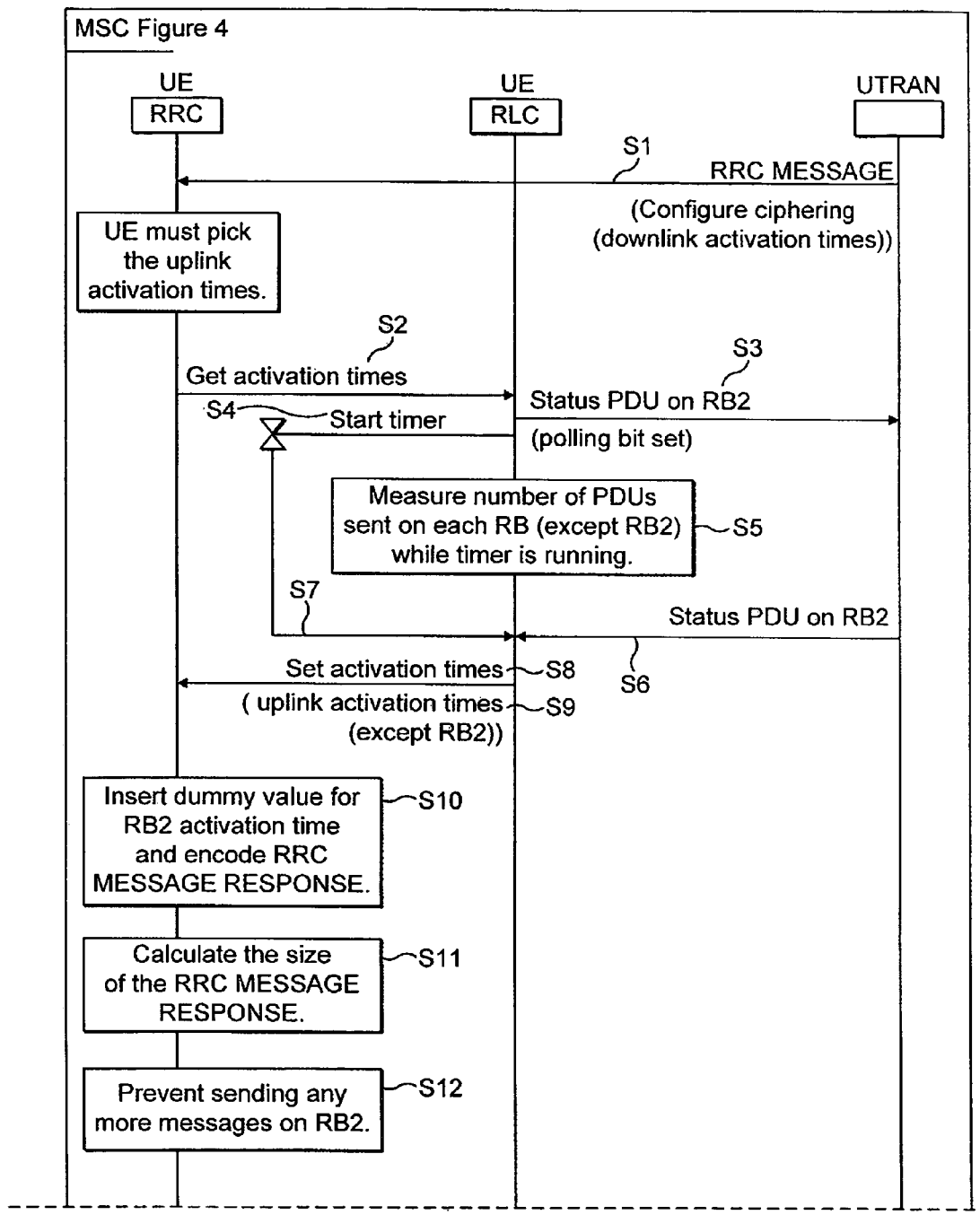
FIG. 4 is a message sequence chart illustrating a method of calculating the uplink ciphering activation time.
Figure 4:
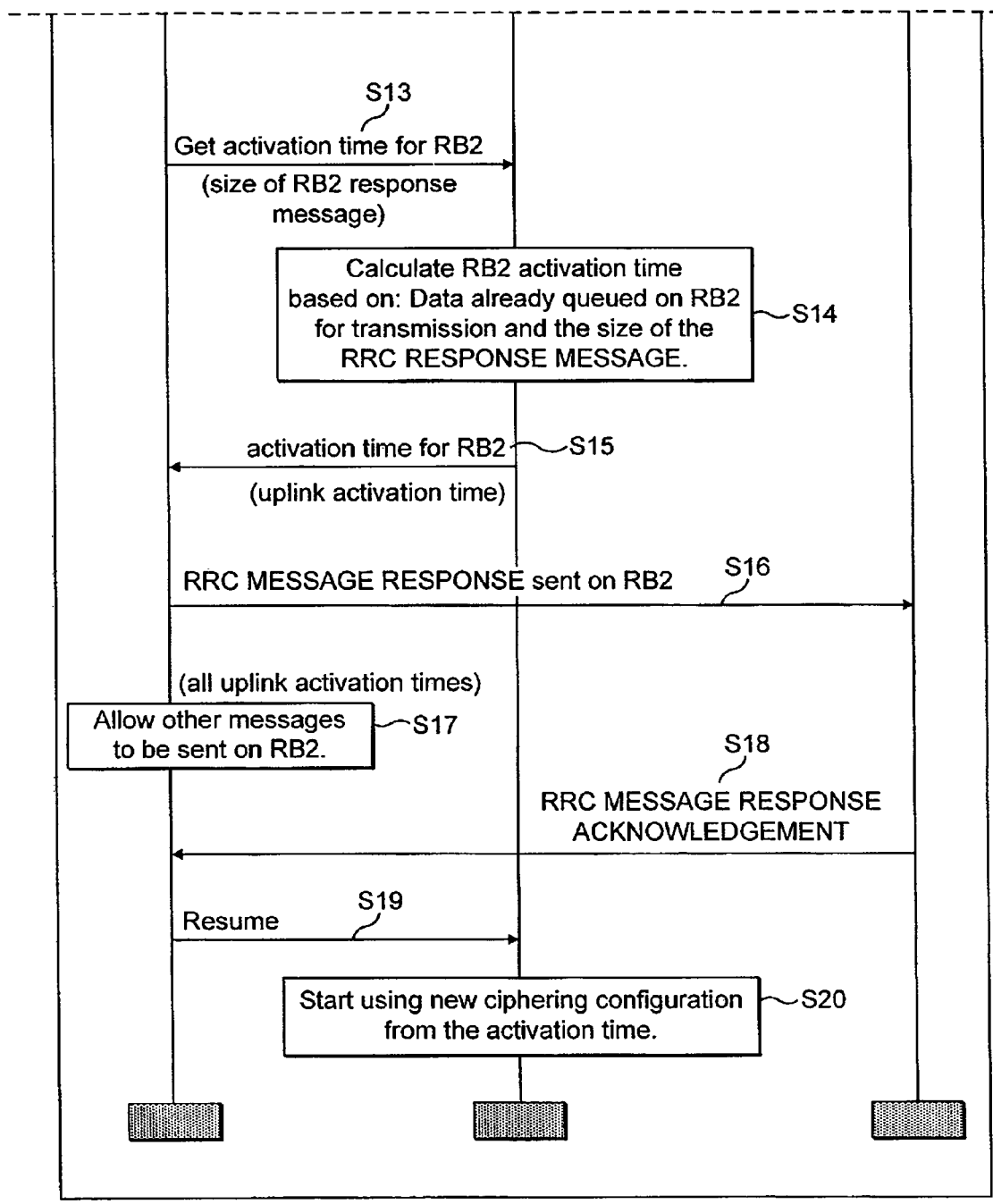

A further solution that addresses these drawbacks will now be described with reference to FIG. 4. FIG. 4 is a message sequence chart illustrating a method of calculating the uplink ciphering activation time, in which the UE determines the uplink ciphering activation time for an RB including RB2. The UTRAN initiates a ciphering change by sending an RRC message which is received by the UE RRC sub-layer 131 (step s1). The RRC 131 sends a request to the RLC 122 to get the uplink activation time (step s2). In response, the RLC 122 sends a polling data packet (Status PDU (Protocol Data Unit)) on the signalling radio bearer RB2 (step s3) and sets a timer (step s4). While the UE is waiting for an acknowledgment from the UTRAN, it measures the number of data packets (PDUs) sent on each of the radio bearers to be configured (step s5), for example by determining the increase in the sequence number on each target radio bearer. The UTRAN sends back an acknowledgment to the UE on receipt of the data packet which is received at the UE (step s6). On receipt of this acknowledgment, the timer is stopped (step s7). The uplink activation time for each target radio bearer (except RB2) is then set to the current sequence number for the respective bearer plus the measured increment in sequence number (step s8) and this information is sent to the RRC 131 (step s9). The above technique can be summarised as follows: (1) measure in milliseconds (or TTI intervals), the time taken for an AM data PDU to be sent to the UTRAN and be acknowledged, using RB2. Call this time T. Then, (2) on each RB to be configured measure how many data PDUs are sent in time T. Call this N. Finally, (3) set the activation time for each RB to be the current sequence number+N.

A number of variations on the above technique are possible. For example, historical or estimated flow rate information is used rather than measuring the actual number of packets being sent. Another possibility is that, rather than sending a poll request, measurement is made of an RRC message response sent to the UTRAN to more closely represent the real situation. In this case, since an RRC message response will generally require more than one PDU to contain it, the RRC could be used to measure how long it takes to send an RRC message response on RB2 and receive its acknowledgment. This is then the time T referred to above. Measuring each RRC response message would mean that the RRC had a value of T ready when the RRC message arrived to change the ciphering configuration.

Rather than using any general RRC message, T is determined from the actual time that it took to send and acknowledge the RRC response message responding to the RRC ciphering configuration request message. This can be used for subsequent occasions on which the ciphering configuration needs to be changed. However, for the first time that the uplink activation times are calculated, a value of T will not exist and will need to be selected using one of the other methods described herein.

As a further alternative, when each RB (except RB2) is asked to determine its uplink activation time, it measures how many PDUs are sent between receiving the "request for activation time" signal (step s2) from the RRC and receiving the "resume" signal from the RRC (step s19), which is sent to each RLC entity when the UTRAN has acknowledged receipt of the RRC response message containing the list of uplink activation times. This measured number of PDUs is N. The next time that an activation time is requested, the RLC entity simply adds N to its current sequence number to give the activation time. This method has the advantage of not requiring activation of a timer.

RBs that are configured for AM are special in that they are both uplink and downlink in the same RB. In this case, the downlink activation times provided by the UTRAN could be used to determine the uplink activation times, so that:

Uplink activation time=current uplink sequence number+UTRAN downlink activation time−current downlink sequence number Furthermore, although FIG. 4 shows that the RLC layer 122 determines the activation time, this could be determined by the RRC layer 131.

Numerous further possibilities exist within the scope of the claims. For example, for the first time that the uplink calculation times are calculated, an arbitrary value of N is used. On subsequent occasions, the UE refines its estimate of N. For example, the RLC compares the SN when the "resume" signal arrives to the value it chose for N. If there is a big difference, then it will choose a smaller value of N next time. If it finds that it has stopped sending data because it chose N to be too small, it will choose a larger value of N next time.

In relation to the special case of radio signalling bearer RB2, Section 8.6.3.4 of the 3GPP TS 25.331 v3.13.0. RRC protocol specification states that RB2 is not suspended while the ciphering on RB2 is reconfigured, since it must be used to send a response message containing the uplink activation times from the RRC 131 to the UTRAN on RB2 before the activation time has been reached. This means that choosing an uplink activation time for RB2 is difficult. If it is chosen to be too soon, then there is a possibility that other messages sent on RB2 will trigger the activation time before the UE has sent the response message containing the uplink activation times. Hence, the UTRAN will not be able to decipher the response message. Choosing the activation time to be too far in the future violates the RRC protocol specification, which states that the delay should be minimised.

A separate calculation of uplink activation time is therefore done for RB2. Since RB2 is only used to carry RRC messages, the RRC 131 is in full control of what messages are or are not submitted to RB2 for transmission. The RB2 uplink activation time is not chosen until the very last possible moment before the UE wishes to send the response message. The UE then follows the procedure illustrated in FIG. 4.

A dummy value for the uplink activation time RB2 is inserted into the RRC MESSAGE RESPONSE and the message is PER encoded (in accordance with the Packet Encoding Rules described in the ITU-T specification X691) ready for submission to the RLC for transmission (step s10). Once encoded, the UE measures the size of the RRC MESSAGE RESPONSE in bytes (step s11). The RRC 131 stops sending messages on R132 (step s12) and then asks the RLC 122 to give an uplink activation time for RB2, informing it of the size of the response message (step s13).

The RLC 122 calculates how many PDUs are required to send the data which is already waiting in a queue to be sent on RB2 and adds to this the number of PDUs required to send the RRC message response. It adds this value to the current sequence number to give the activation time for RB2 (step s14). This will be the sequence number immediately after the RRC response message has been sent. The RLC informs the RRC of the uplink activation time (step s15).

The RRC inserts this value into the RRC MESSAGE RESPONSE and sends this to the UTRAN via the RLC (step s16). Once it has sent the message to the RLC it allows other messages to be sent on RB2 again (step s17).

As an alternative to measuring the exact size of the RRC MESSAGE RESPONSE, the RRC uses a look up table to determine the size of the message and informs the RLC of this, as shown in the example table below:

| Message | Bytes |
| --- | --- |
| PhysicalChannelReconfigurationComplete | 162 |
| RadioBearerReconfigurationComplete | 162 |
| RadioBearerReleaseComplete | 162 |
| RadioBearerSetupComplete | 165 |
| SecurityModeComplete | 78 |
| TransportChannelReconfigurationComplete | 162 |
| UtranMobilityInformationComplete | 161 |

As a further alternative, the RRC uses the worst case value for all message types. The table above shows that the biggest message is RadioBearerSetupComplete which requires at most 165 bytes. Therefore the RRC will state that at least 165 bytes must be able to be sent before the uplink activation time. A safety factor, for example, 3 bytes, may also be added.

On receipt of the RRC MESSAGE RESPONSE, the UTRAN responds with an acknowledgment (step s18) and the RRC 131 instructs the RLC 122 to resume operation (step s19). The RLC 122 then starts using the new ciphering configuration when the activation time is reached (step s20). Details of the ciphering procedure itself are well documented in the specification 3GPP TS 33.102 v3.13.0, section 6.6.3 and will not be described further here.

The description above has dealt with the configuration of ciphering for UM and AM RLC mode radio bearers. In the case of Transparent Mode (TM) RLC mode radio bearers, the MAC sub-layer 121 is responsible for ciphering data. When the RRC 131 receives the ciphering mode Information parameter, after it has actioned all other parameters in the message, it will send the information to the MAC 121 sub-layer so that the TM RLC Mode entities can be reconfigured. This is in accordance with section 8.6.3.4 of the 3GPP TS 25.331 v3.13.0. RRC protocol specification. It must also tell the MAC layer when the new configuration is to take place. The activation time is provided by the UTRAN as a Connection Frame Number (CFN) (ActivationTimeForDPCH). The CFN is used as part of the unique identifier for each frame using the RLC transparent mode (TM). It also provides a means of synchronisation between the UE and the UTRAN, i.e. the ciphering activation time for TM RLC mode entities. There are two CFNs, one for all downlink radio bearers using TM RLC mode (CFN_DL) and one for all uplink radio bearers using TM RLC mode (CFN_UL). However in practice these CFN values are virtually identical. The CFN_UL reflects the UE CFN value, while the CFN_DL reflects the UTRAN CFN value. The CFN is updated and maintained by the physical layer 110, which sends the CFN_UL and CFN_DL to the MAC sub-layer 121.

The CFN_UL in the UE is incremented at every transmission time interval TTI and CFN_DL in the UE is incremented with every received data packet. Only the CFN_UL is sent to the RRC 131 when requested. Reference is further directed to section 6.6.4.1 of the 3GPP TS 33.102 v3.13.0. Security Architecture specification.

It is anticipated that when the CFN_UL and CFN_DL are sufficiently close together, that the ciphering IE ActivationTimeForDPCH will serve for both uplink and downlink and hence there will be no need to calculate a different uplink activation time.

Figure 5:
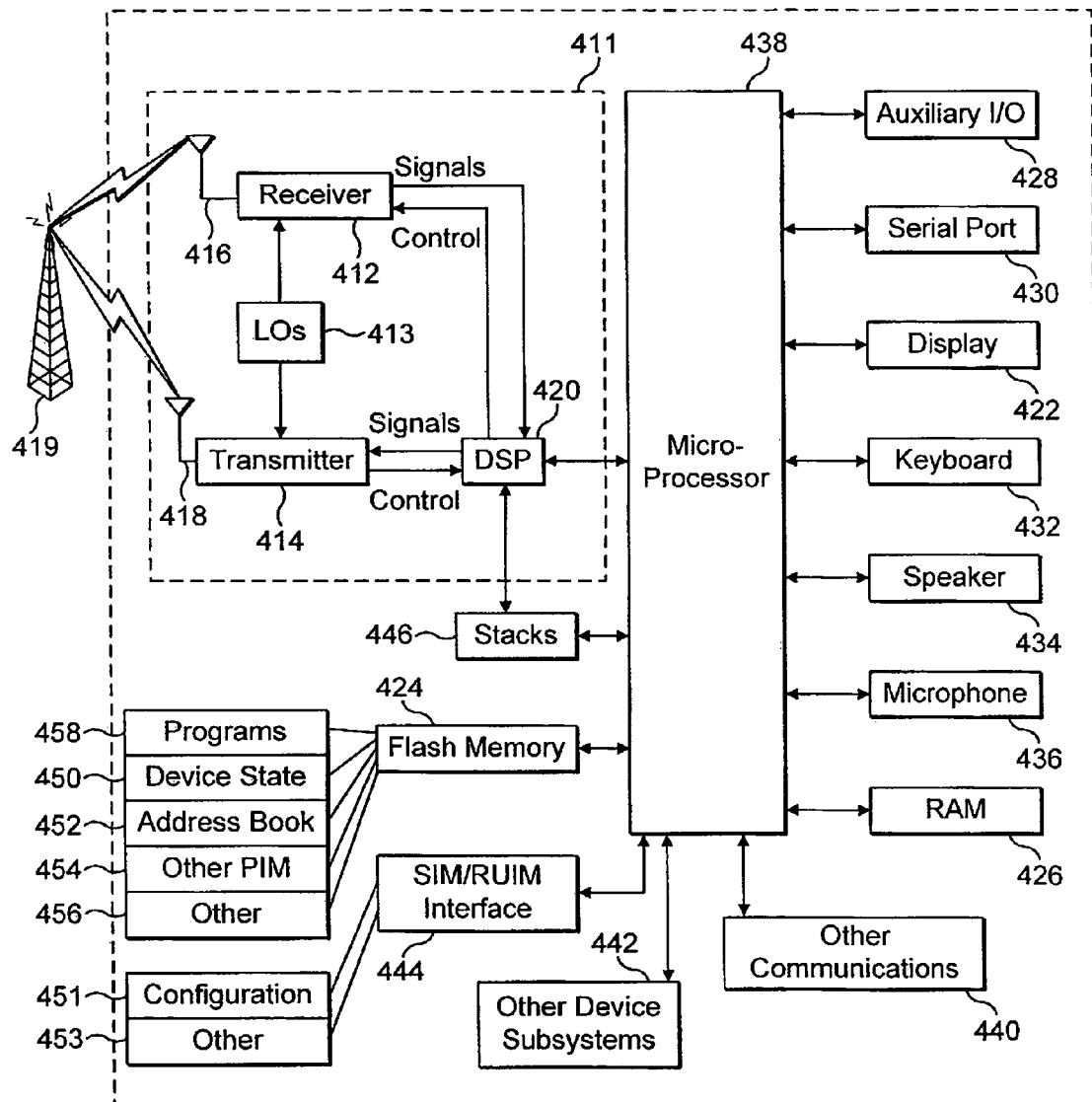
FIG. 5 is a block diagram illustrating a mobile device, which can act as a UE and co-operate with the apparatus and methods of FIGS. 1 to 4.

Turning now to FIG. 5, FIG. 5 is a block diagram illustrating a mobile device, which can act as a UE and co-operate with the apparatus and methods of FIGS. 1 to 4, and which is an exemplary wireless communication device. Mobile station 400 is preferably a two-way wireless communication device having at least voice and data communication capabilities. Mobile station 400 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 400 is enabled for two-way communication, it will incorporate a communication subsystem 411, including both a receiver 412 and a transmitter 414, as well as associated components such as one or more, preferably embedded or internal, antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate. For example, mobile station 400 may include a communication subsystem 411 designed to operate within the Mobitex™ mobile communication system, the DataTAC™ mobile communication system, GPRS network, UMTS network, EDGE network.

Network access requirements will also vary depending upon the type of network 419. For example, in the Mobitex and DataTAC networks, mobile station 400 is registered on the network using a unique identification number associated with each mobile station. In UMTS and GPRS networks, however, network access is associated with a subscriber or user of mobile station 400. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 400 will be unable to carry out any other functions involving communications over the network 400. The SIM interface 444 is normally similar to a card-slot into which a SIM card can be inserted and ejected like a diskette or PCMCIA card. The SIM card can have approximately 64K of memory and hold many key configuration 451, and other information 453 such as identification, and subscriber related information.

When required network registration or activation procedures have been completed, mobile station 400 may send and receive communication signals over the network 419. Signals received by antenna 416 through communication network 419 are input to receiver 412, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Mobile station 400 preferably includes a microprocessor 438 which controls the overall operation of the device. Communication functions, including at least data and voice communications, are performed through communication subsystem 411. Microprocessor 438 also interacts with further device subsystems such as the display 422, flash memory 424, random access memory (RAM) 426, auxiliary input/output (I/O) subsystems 428, serial port 430, keyboard 432, speaker 434, microphone 436, a short-range communications subsystem 440 and any other device subsystems generally designated as 442.

Some of the subsystems shown in FIG. 5 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the microprocessor 438 is preferably stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Microprocessor 438, in addition to its operating system functions, preferably enables execution of software applications on the mobile station. A predetermined set of applications that control basic operations, including at least data and voice communication applications for example, will normally be installed on mobile station 400 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 419. In a preferred embodiment, the PIM data items are seamlessly integrated, synchronized and updated, via the wireless network 419, with the mobile station user's corresponding data items stored or associated with a host computer system. Further applications may also be loaded onto the mobile station 400 through the network 419, an auxiliary I/O subsystem 428, serial port 430, short-range communications subsystem 440 or any other suitable subsystem 442, and installed by a user in the RAM 426 or preferably a non-volatile store (not shown) for execution by the microprocessor 438. Such flexibility in application installation increases the functionality of the device and may provide enhanced on-device functions, communication-related functions, or both. For example, secure communication applications may enable electronic commerce functions and other such financial transactions to be performed using the mobile station 400.

In a data communication mode, a received signal such as a text message or web page download will be processed by the communication subsystem 411 and input to the microprocessor 438, which preferably further processes the received signal for output to the display 422, or alternatively to an auxiliary I/O device 428. A user of mobile station 400 may also compose data items such as email messages for example, using the keyboard 432, which is preferably a complete alphanumeric keyboard or telephone-type keypad, in conjunction with the display 422 and possibly an auxiliary I/O device 428. Such composed items may then be transmitted over a communication network through the communication subsystem 411.

For voice communications, overall operation of mobile station 400 is similar, except that received signals would preferably be output to a speaker 434 and signals for transmission would be generated by a microphone 436. Alternative voice or audio I/O subsystems, such as a voice message recording subsystem, may also be implemented on mobile station 400. Although voice or audio signal output is preferably accomplished primarily through the speaker 434, display 422 may also be used to provide an indication of the identity of a calling party, the duration of a voice call, or other voice call related information for example.

Serial port 430 in FIG. 5, would normally be implemented in a personal digital assistant (PDA)-type mobile station for which synchronization with a user's desktop computer (not shown) may be desirable, but is an optional device component. Such a port 430 would enable a user to set preferences through an external device or software application and would extend the capabilities of mobile station 400 by providing for information or software downloads to mobile station 400 other than through a wireless communication network. The alternate download path may for example be used to load an encryption key onto the device through a direct and thus reliable and trusted connection to thereby enable secure device communication.

Other communications subsystems 440, such as a short-range communications subsystem, are further optional components which may provide for communication between mobile station 400 and different systems or devices, which need not necessarily be similar devices. For example, the subsystem 440 may include an infrared device and associated circuits and components or a Bluetooth™ communication module to provide for communication with similarly enabled systems and devices.

When mobile device 400 is used as a UE, protocol stacks 446 include an apparatus and method for determining uplink ciphering activation time in universal mobile telecommunications system user equipment.

Although the terms message, procedure, and command have been specifically used in the above description and the accompanying figures, it is envisaged that either messages, commands, or procedures be handled simultaneously in accordance with the apparatus and methods of the present application, so that these terms can be interchanged without changing the scope or departing from the spirit of the present application.

The above-described embodiments of the present application are intended to be examples only. Those of skill in the art may effect alterations, modifications and variations to the particular embodiments without departing from the scope of the application.

We claim:

1. A method of determining uplink ciphering activation time for a communications channel between a user equipment and a telecommunications network, said method comprising:
    using a hardware processor identifying a flow rate for the communications channel during a time interval dependent upon a response time relating to a message sent between the user equipment and the telecommunications network; and
    selecting an uplink activation time for each communications channel to determine a time at which a new ciphering configuration is to be implemented on the communications channel, the uplink activation time for a communications channel being dependent upon flow rate for the communications channel and minimizing delay in the change to the new ciphering configuration.

2. The method of claim 1, further comprising:
    determining a response time for a message from the user equipment to the network, said response time being related to the time at which an acknowledgement of said message is received from the network at the user equipment; and
    determining the flow rate during a time interval represented by the response time.

3. The method of claim 2, further comprising:
    sending the message from the user equipment to the network on a signaling channel; and
    determining the response time from said message.

4. The method of claim 3, wherein said identifying further comprises:
    determining the flow rate for the communications channel during a time interval represented by the response time.

5. The method of claim 1, wherein the network comprises a Universal Mobile Telecommunications System (UMTS) Terrestrial Access Network (UTRAN).

6. A method of determining uplink ciphering activation time comprising:

providing a user equipment enabled for use in a cellular telecommunications systems;

providing a network enabled for use in a cellular telecommunications system, further enabled to form communications channels with said user equipment;

forming a plurality of communications channels between the user equipment and the telecommunications network;

selecting an uplink activation time for each communications channel to determine a time at which a new ciphering configuration is to be implemented on the communications channel, the uplink activation time for a communications channel being dependent upon a measured flow rate for the communications channel concerned to minimize delay in the change to the new ciphering configuration;

determining a response time for a message from the user equipment to the network, said response time being related to the time at which an acknowledgement of said message is received from the network at the user equipment;

determining the flow rate during a time interval represented by the response time;

sending the message from the user equipment to the network on a signaling channel;

determining the response time from said message; and determining the flow rate, as a rate at which a logical sequence number is increasing, for the communications.

7. The method of claim 6, wherein said determining the uplink activation time comprises setting the activation time to be a function of a current sequence number for the channel plus the measured increment.

8. User equipment (UE) for determining uplink ciphering activation time for a plurality of communications channels, the communications channels enabled for communication with a Universal Mobile Telecommunications System (UMTS) Terrestrial Radio Access Network (UTRAN) compliant telecommunications network, the uplink ciphering activation time for determining the time at which a new ciphering configuration is to be used by the UE, the UE comprising:

a hardware processor configured to identify a flow rate for the communications channels during a time interval dependent upon a response time relating to a message sent between the user equipment and the telecommunications network, and configured to calculate an uplink activation time for each communications channel dependent on the measured flow rate for the communications channel and minimizeing delay in the change to the new ciphering configuration.

* * * * *